United States Patent

McVoy

[15] 3,637,919

[45] Jan. 25, 1972

[54] COLOR TELEVISION EQUIPMENT

[72] Inventor: David S. McVoy, Gainesville, Fla.

[73] Assignee: Coaxial Scientific Corporation, Alachua, Fla.

[22] Filed: July 13, 1970

[21] Appl. No.: 54,411

[52] U.S. Cl. ....................178/5.2 R, 178/5.4 R, 178/5.4 CD
[51] Int. Cl. ....................H04n 9/34
[58] Field of Search....................178/5.2, 5.4, 5.4 CD, 5.4 SY

[56] References Cited

UNITED STATES PATENTS

| | | | |
|---|---|---|---|
| 2,739,181 | 3/1956 | Sleeper, Jr. et al. | 178/5.2 |
| 3,440,341 | 4/1969 | Reekie et al | 178/5.4 CD |
| 3,267,207 | 8/1966 | Okazaki et al | 178/5.4 CD |
| 3,512,094 | 5/1970 | Dann et al. | 178/5.4 |

*Primary Examiner*—Richard Murray
*Attorney*—Olson, Trexler, Wolters & Bushnell

[57] ABSTRACT

Color television equipment includes a system in which a frame of video information is transmitted by sequentially transmitting the video signals so that for successive lines being scanned the transmitted signal will be representative of red, green and blue light, respectively. At the end of the frame the phase of the sequence shifts so that for each line in the next frame the transmitted signal will represent a color that is different for that line in the previous frame. At the end of the third frame the red, green and blue video outputs for each line will have been transmitted. Counters and related circuitry in the transmitter and in a compatible receiver are utilized to display the signals in proper synchronism in the three-electron-gun CRT of the receiver. The foregoing line sequential system may be utilized in a videotape recorder which records and retransmits video signals.

10 Claims, 10 Drawing Figures

INVENTOR
DAVID S. McVOY
by: Olson, Trexler, Wolters & Bushnell ATTYS.

INVENTOR
DAVID S. McVOY
by: Olson, Trexler, Wolters & Bushnell
ATTYS.

INVENTOR
DAVID S. McVOY by: Olson, Trexler, Wolters & Bushnell
ATTYS.

COLOR TELEVISION EQUIPMENT

This invention relates to improvements in color television.

The present standard method of colorcasting utilizes, in effect, three cameras, one for each of the primary colors. An encoding device multiplexes all three camera outputs on one television channel and a three-gun cathode-ray tube is utilized in the receiver. By this arrangement all three primary colors transmitted simultaneously for each line scanned, and all three electron guns are operated simultaneously in the cathode-ray tube of the receiver. The receiver requires color-decoding circuitry, and in addition high-current sweep and power supply circuits to operate the three electron guns of the cathode-ray tube, all of which contribute to the high cost of color television receivers.

An object of this invention is to provide a color television system embodying a transmitter which is compatible with the present standard colorcasting systems but which eliminates the need in the receiver for color subcarrier demodulator circuits. The receiver of the present invention is considerably less expensive than present conventional color receivers. The novel receiver may, however, employ a standard three-gun CRT.

A further object of this invention is to provide a color television system in which a frame of video information is transmitted by sequentially transmitting the video signals for successive lines being scanned so that for each line being scanned the transmitted signal will be representative of monochromatic light only and the transmitted signal for each successive line scanned will represent a color that is different from the color represented by the preceding line scanned. Thus, for one line the transmitted signal will be red video information; for the next line the transmitted signal will be green video information; for the next line the transmitted signal will be blue video information. This sequence repeats throughout the frame. At the end of the frame the phase of the sequence shifts for the next frame so that the transmitted signal for each line in that next frame will be representative of video information of a color that is different for that line in the previous frame. At the end of the third frame the red, green, and blue video outputs for each line will have been transmitted. The scanning and transmissions thus repeat themselves. A standard three-gun color television camera may be used.

A still further object of this invention is to provide a color video receiver for receiving signals transmitted, as aforesaid, in which only one of the three electron guns in the cathode-ray tube of the receiver is operated at any time, thereby eliminating the need for heavy sweep and power supply circuits.

Another object of this invention is to provide a videotape recorder which records and transmits video signals in accordance with the principles of the line sequential scanning system described above.

A further and important object of this invention is to provide a system of the type stated in which the monochromatic video outputs from the sequentially scanned lines may be recorded or encoded conventionally for transmission, and in which there is circuitry in the receiver and transmitter for maintaining the electron gun outputs in the cathode-ray tube of the receiver in synchronism with the scanning by the color camera. The aforesaid circuitry is preferably comprised of counters, the outputs of which serve as controls for the transmission or recording of the color signals as well as for controlling the cathode-ray tube grids of the receiver. The counters are preferably actuated by synchronizing pulses used in the system, the counter in the receiver also being reset by a transmitted keying signal which serves to cycle the receiver counter in synchronism with the transmitted signals.

The attainment of the above and further objects of the invention will be apparent from the following description taken in conjunction with the accompanying drawing forming a part thereof:

Figure 1:
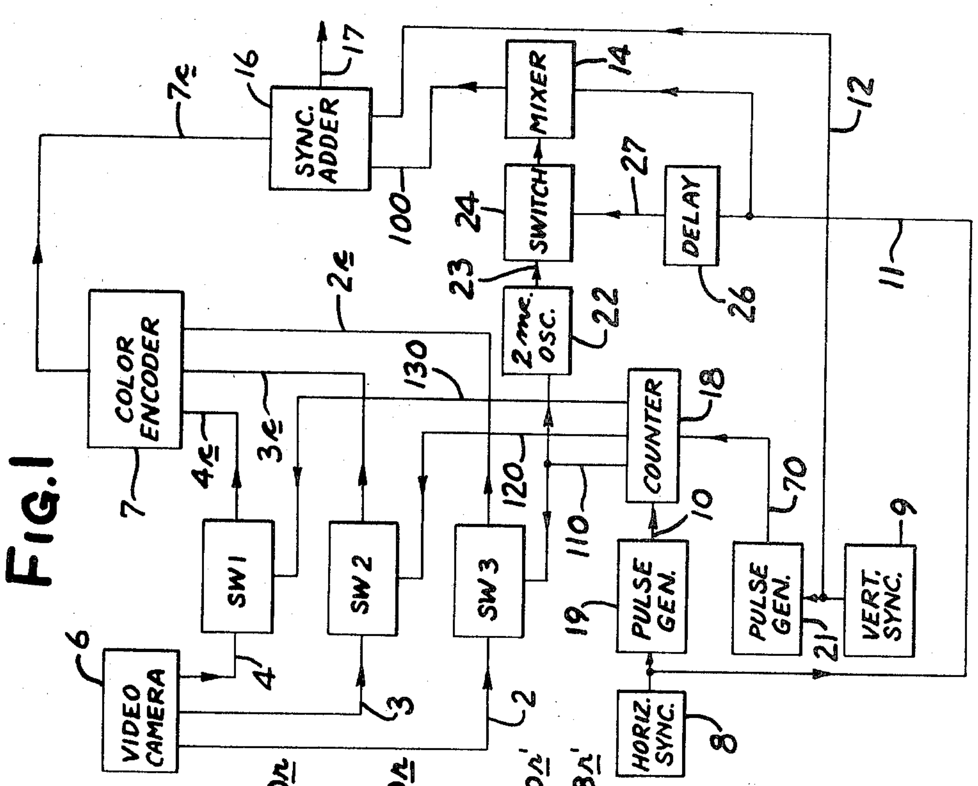
FIG. 1 is a block diagram of a transmitter unit constructed in accordance with the present invention.

Referring now in more detail to the drawing and in particular to FIG. 1, red, green and blue color-information signals are sent respectively over conductors 2, 3, 4 from a conventional tricolor video camera 6. These video signals are fed to through electronic gates or switches SW1, SW2, SW3 and then over conductors 2*c*, 3*c*, 4*c* to a conventional color encoder 7 which encodes the video signals in the conventional subcarrier method. The transmitter unit of FIG. 1 also includes conventional horizontal and vertical synchronizing pulse generators 8, 9, which transmit pulses over conductors 11, 12 respectively. Horizontal pulses also pass through a mixer 14 and then over conductor 100 to a synchronizing pulse adder 16 while the vertical synchronizing pulses are sent directly to the synchronizing pulse adder 16. The synchronizing pulses are added to the video waveforms sent out from the encoder 7 over conductor 7*c* and the composite is sent over conductor 17 for modulation of and transmission by a carrier frequency in a known manner.

Figures 2, 3, 4:
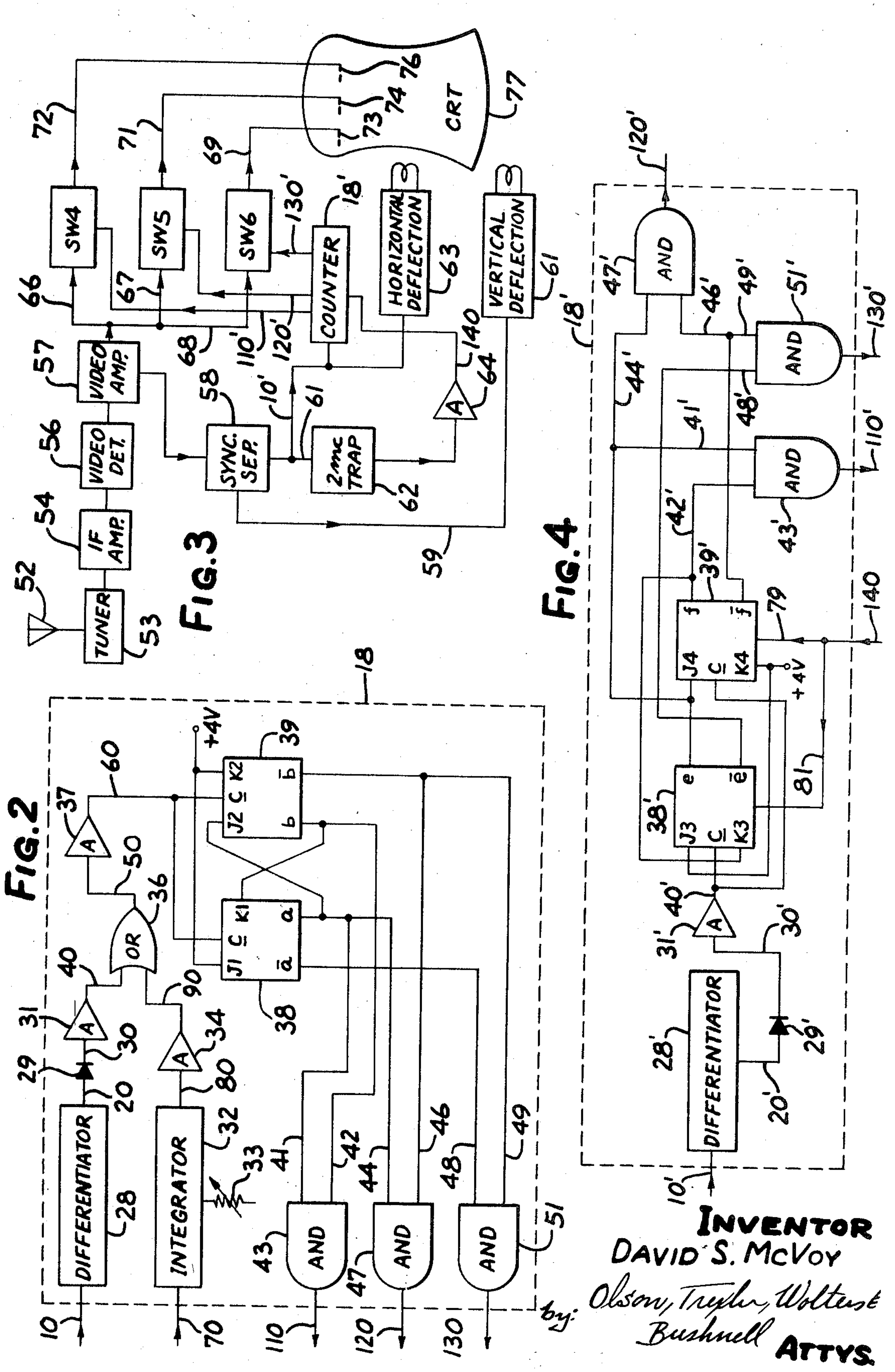
FIG. 2 is a block diagram of the counter used in the transmitter of FIG. 1.
FIG. 3 is a block diagram of a receiver unit constructed in accordance with the present invention.
FIG. 4 is a block diagram of the counter used in the receiver of FIG. 3.

The switches SW1, SW2, SW3 (assumed to be for blue, green and red, respectively) are sequentially actuated to allow passage of the color-representing signals in a predetermined sequence as controlled by a counter 18 that is shown in FIG. 2 and which will presently be more fully described. The counter 18 is triggered by pulse generators 19, 21 which are actuated by the synchronizing pulses. Signals from the pulse generators 19, 21 send signals over conductors 10, 70. Each time a signal is sent over conductor 10 or 70 the counter is "advanced" to send out a signal over conductor 110 or 120 or 130, as the case may be, in a repeating sequence to open switches SW1, SW2, SW3 in a corresponding repeating sequence. In this regard the pulse generator 19 produces one pulse per horizontal line scanned by the camera 6 and thus triggers the counter 18 once for each horizontal pulse. Consequently, only one of the switches SW1, SW2, SW3 will open for each horizontal line scanned to pass a signal through that line to the encoder 7. In addition once every frame the pulse generator 21, which is triggered in response to the vertical synchronizing pulses, sends a pulse to the counter 18 to actuate it. This serves the purpose of shifting the phase of the operation of the switches SW1, SW2, SW3 once during each frame. Since the standard 525-line picture would result in 175 operations of the switches SW1, SW2, SW3, a failure to shift the phase of the switching in one line relative to the next line would result in the same color information being displayed for each line of each frame. However, by shifting the phase each frame, any particular line will display successively red, green and blue color information for successive frames.

Figure 6:
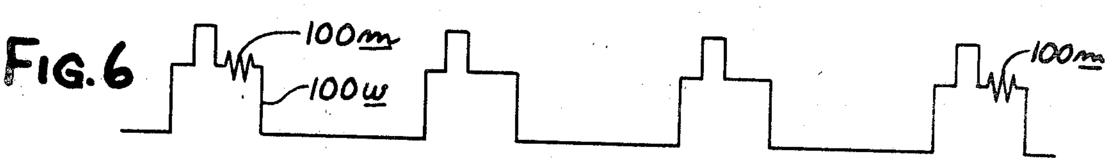
FIGS. 6–10 are illustrations of waveforms appearing at various portions of the circuitry of the invention.

The counter 18 also activates an oscillator 22 each time a pulse is sent out over conductor 110 and SW3 is opened. The oscillator 22 is preferably tuned to 2.0 mc. although a frequency of 2.0 to 3.0 mc. is acceptable. The output of the oscillator 22 over conductor 23 is fed to an electronic switch 24 that is controlled by the horizontal synchronizing pulses on conductor 11 and a delay circuit 26, the output of which on conductor 27 results in opening of the switch 24. This controlled output of the switch 24 is sent to the mixer 14. The circuit 26 provides approximately a 2-microsecond delay between the leading edge of the part of the horizontal synchronizing pulse that is above the blanking voltage level and the beginning of the closing of the switch 24. The switch 24 is turned on for about 2 to 3 microseconds. This places the 2.0-mc. pulse on the blanking pulse and not in the video-information portion of the subsequently formed composite signal that is transmitted. FIG. 6 shows the composite output signal 100*w* on conductor 100. The waveform portion 100*m* is the 2.0-mc. burst and is shown on the blanking portion of the pulse 100*w*.

Figure 7:
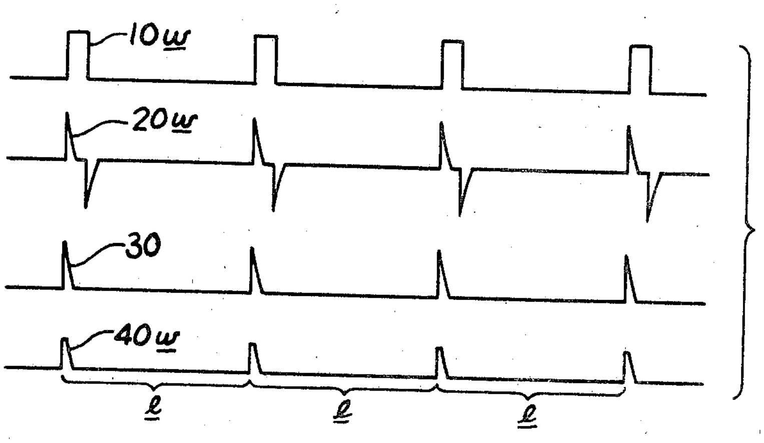

Referring to FIG. 2 which shows in more detail the counter 18 of FIG. 1, the output of the pulse generator 19 over conductor 10 is that portion of the synchronizing pulse that is above the blanking-voltage level and has a waveform 10*w* as shown in FIG. 7. The pulses 10*w* pass through a differentiator 28 to produce an output on conductor 20 having spike waveform 20*w*, FIG. 7. Diode 29 removes the negative portions of the pulses to leave output waveform 30*w* on conductor 30. The signals pass through an amplifier 31 which is overdriven by the signals whereby the pulses are clipped to produce signals on conductor 40 having a waveform 40*w*. There is a pulse 40*w* for each scanned line *l*. See FIG. 7.

Figure 8:
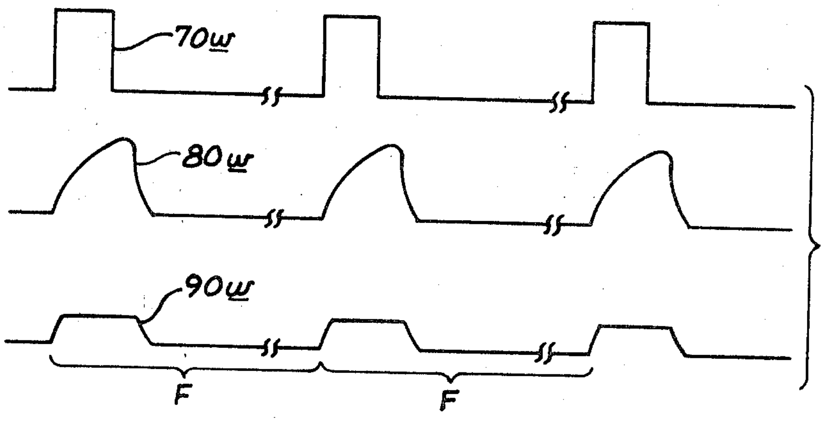
Figures 9, 10:
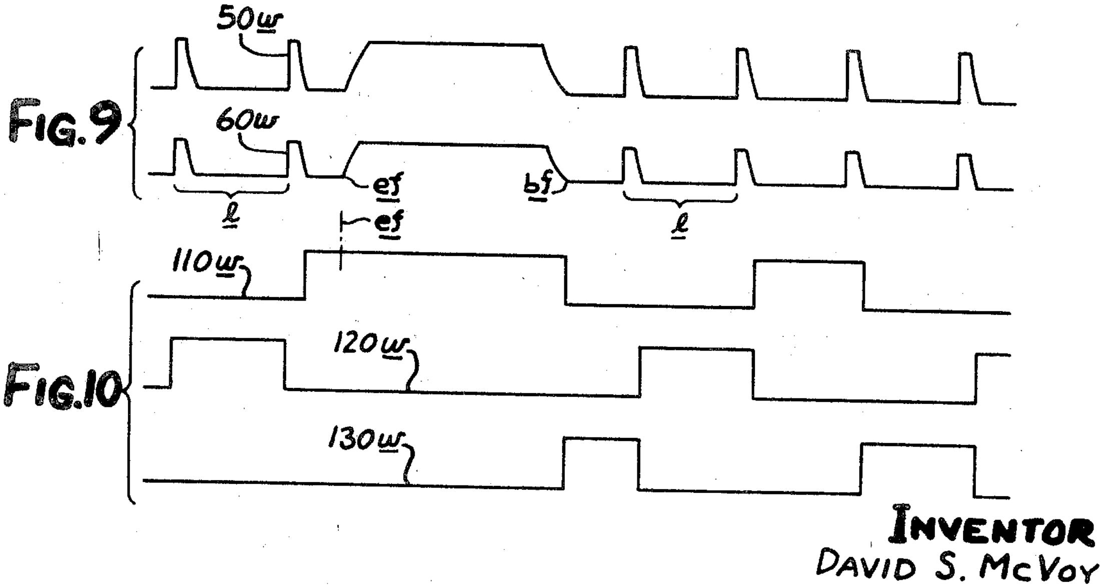

The vertical pulse generator 21 produces a long pulse 70*w* (FIG. 8) on conductor 70 once each frame F. Unlike the conventional vertical pulse, the pulse 70*w* is not serrated. This signal enters an integrator 32 and the latter extends or widens the pulse in accordance with the adjustment of a variable control (e.g., a variable resistor) 33. The output on conductor 80 which has a waveform 80*w*, passes through an amplifier 34, which like the amplifier 31 clips the peaks of the pulses to provide a waveform output 90*w*, once each frame F, on conductor 90. The signals on conductors 40, 90 are coupled together through an OR-gate 36 to produce a signal on conductor 50 having a waveform 50*w* as shown in FIG. 9. The signals on conductor 50 are sent through another overdriven amplifier 37 which clips the peaks to provide an output waveform 60*w* on conductor 60.

In the waveform 60*w* of FIG. 9 a horizontal pulse is shown for each line *l*. In addition there is one vertical pulse from the end of the scanned frame *ef* to the beginning of the next frame *bf*. In the proper operation of the counter 18 the long vertical pulse (*ef* to *bf*) extends 2½ horizontal lines so that it will obscure exactly two horizontal scanned lines. This has the effect of reducing the number of horizontal lines scanned by one for each vertical scanning pulse since a single long vertical pulse takes the place of two horizontal pulses. This causes the aforementioned phase change of the switching sequence for switches SW1, SW2 and SW3.

The signals on conductor 60 are used as clock pulses to drive two J–K-type flip-flops 38, 39. These J–K flip-flops are digital transistorized logic circuits of known configuration and are available commercially in the form of integrated circuits. Suffice it to say, however, that each flip-flop consists of two directly coupled flip-flops operating on a "master-slave" principle. The input information is stored in the "master" when the clock voltage is high and is transferred to the "slave" when the clock voltage goes low. Each flip-flop has its clock input *c* connected to conductor 60. Conventionally, also, flip-flop 38 has inputs J1, K1 and outputs *a* and $\bar{a}$, which are always at complement states. Flip-flop 39 has, respectively, corresponding inputs J2, K2 and outputs *b*, $\bar{b}$. As is known in the art, a J–K flip-flop operates as follows, reference being made to the nomenclature of flip-flop 38: If J1 and K1 are placed in a "1" state (e.g., high, more positive) the states of *a* and $\bar{a}$ will become their respective complements, regardless of their previous conditions. If a "1" condition is applied to J1 and K1 is at a "0" state (e.g., low, more negative) then *a* will become "1" and $\bar{a}$ will become "0" regardless of their previous conditions. If J1 is "0" and K1 is at "1," then *a* will become "0" and $\bar{a}$ will become "1." If J1 and K1 are placed at "0" no changes in *a* or $\bar{a}$ will occur. As indicated above, the changes in states will occur on the falling (trailing) edge of the triggering or clock pulse 60*w* (FIG. 9). The flip-flop 39 operates in a similar manner.

As seen in FIG. 2, J1 and K2 are permanently connected together and to a 4-volt positive source. K1 is connected to *b* and J2 is connected to *a*. The outputs *a* and *b* are connected through conductors 41, 42 to AND-gate 43; the outputs *a* and $\bar{b}$ are connected through conductors 44, 46 to AND-gate 47; and the outputs $\bar{a}$, $\bar{b}$ are connected through conductors 48, 49 to AND-gate 51. Where signal inversions are desired NAND gates may be used.

In an assumed starting condition of the counter 18, $\bar{a}$ and $\bar{b}$ will be considered in the "1" or high state making *a* and *b* in the "0" or low state. These are the states at the beginning of a clock pulse. At the trailing edge of the clock pulse J2, being connected to *a*, becomes "0," and therefore $\bar{a}$ goes to "1" state. K1, being connected to *b*, becomes "0" and so $\bar{b}$ becomes "1." With *a* and $\bar{b}$ both in the "1" state, there are state "1" or high signals on conductors 44, 46 and a signal is therefore sent out from AND-gate 47 on conductor 120 to open the switch SW2.

At the end of the next clock pulse, J1 is at "1" and K1 will go to "0" since it is connected to *b*. Therefore, *a* is at "1" and $\bar{a}$ is at "0." In the flip-flop 39, J2, being connected to *a*, now goes to state "1." Thus both J2 and K2 are now at "1" and so the states of *b* and $\bar{b}$ will reverse making *b* at "1" and $\bar{b}$ at "0." With *a* and *b* now both at state "1," there are state "1" signals on conductors 41, 42 causing a signal to be sent out from AND-gate 43 over conductor 110 to open switch SW3. This also triggers the oscillator 22.

At the end of the next clock pulse, K1 goes to state "1" since it is connected to *b*. This makes J1, K1, J2, K2 now all at state "1." The result is that the states of *a*, $\bar{a}$, *b*, $\bar{b}$, all reverse, making $\bar{a}$, $\bar{b}$ go to state "1" and *a* and *b* go to state "0." With high signals at $\bar{a}$, $\bar{b}$ and thus on conductors 48, 49, there will be a signal output from AND-gate 51 to open the switch SW1. This completes one cycle of operation of the switches SW1, SW2, SW3, which repeats in a like manner. The counter 18 is in condition for repeated operation in the manner stated since the "0" states of *a* and *b* will be transferred at the end of the next clock pulse to J2 and K1 by reason of the connections therewith. This results in *a* and $\bar{b}$ being in the state "1" at that time, which provides the conditions for again placing simultaneous signals on conductors 44, 46.

FIG. 10 shows waveforms 110*w*, 120*w*, 130*w* which represent the outputs on conductors 110, 120, 130, respectively. These outputs correspond to the times when the respective AND-gates 43, 47, 51 are open.

The transmitted composite signals are received by a receiver shown in FIG. 3 that has an antenna 52, a tuner 53, IF-amplifier stages 54, video detector 56 and video amplifier 57, all of which are conventional. The video detector 56 demodulates the video carrier leaving the transmitted video for passage to the CRT 77. The video subcarrier onto which the color signals are encoded is ignored in the present receiver since the only purpose of encoding the video is to make the transmitter compatible with present standard color systems and thus allow standard color receivers to receive the signals. The color signals, being the video itself from the camera output on conductors 2, 3, 4, will nevertheless be demodulated in the detector 56.

With the carrier removed, the composite intelligence signal is sent from the video amplifier 57 to a conventional synchronizing separator 58 from which the vertical synchronizing pulses are sent along conductor 59 to the vertical deflection circuits 61. The horizontal synchronizing pulses are sent from the synchronizing separator 58 over conductor 61 to a 2.0 mc. high Q-trap 62 and over conductor 10′ to a counter 18′ and to the horizontal deflection circuits 63. The 2.0-mc. signal passed by the trap 62 passes through an amplifier 64 and then over conductor 140 to the counter 18′. A signal on the conductor 140 serves to reset the counter 18′, as will be presently described.

Video signals from the video amplifier 57 are sent over conductors 66, 67, 68 to the electronic red, green and blue color-information switches or gates SW4, SW5, SW6, respectively. The openings of these switches SW4, SW5, SW6 are under the control of signals on conductors 110′, 120′, 130′ which are the output signals from the counter 18′. The switches SW4, SW5, SW6 control the passage of signals over conductors 69, 71, 72 to the control grids 73, 74, 76 for the respective red, green and blue electron guns of the three-color cathode-ray tube 77. The counter 18′ operates the switches SW4, SW5, SW6 sequentially in precise synchronism with the transmitted color information from the output of the camera over the conductors 2, 3, 4 so that for each horizontal line that is scanned only one of the three conductors 69, 71, 72 will carry a signal and only one of the three electron guns in the tube 77 will be in operation. Furthermore, the synchronizing arrangement in the system results in the red color information actuating only the red electron gun, the blue information actuating only the blue electron gun and the green information only the green electron gun.

The horizontal synchronizing pulses sent out over conductor 10′ are utilized to trigger the counter 18′. Each time a pulse on conductor 10′ is received by the counter 18′, the latter advances one step and actuates one of the switches SW4, SW5, SW6. However after the counter has actuated all three switches SW4, SW5, SW6 in the proper succession, the 2.0-mc. pulse is fed over conductor 140 to the counter 18′. If the system is designed so that the reset pulse is sent out after the red-information switch SW3 in the transmitter has been actuated, the reset pulse is applied to the counter 18′ each time after the red-information switch SW4 in the receiver is actuated. However, at the end of the frame when the long vertical synchronizing pulse is transmitted, the counter 18′ will not be activated by the vertical pulse since that pulse is transmitted over conductor 59 and not over the conductor 10′. Therefore, the counter 18′ will not advance but nevertheless will reset when the next 2.0-mc. burst is received on conductor 140. This provides the phase shift of the sequence of the operation of the switches SW4, SW5, SW6 so that for successive frames each horizontal line will be scanned with color information of a different color than for that line in the previous frame.

Turning now to FIG. 4 which shows the receiver counter 18′, the horizontal pulse on conductor 10′ is fed to a differentiator 28′ and then over conductor 20′ to diode 29′ and from there over conductor 30′ and through amplifier 31′. The signal waveforms on conductors 20′, 30′, 40′ are respectively, as shown at 20*w*, 30*w*, 40*w* in FIG. 7. Two J–K-type flip-flops 38′, 39′ are employed. They are identical in construction and operation to those previously described, and terminals J3, K3, $e$, $\bar{e}$, J4, K4, $f$, $\bar{f}$ correspond respectively to the terminals J1, K1, $a$, $\bar{a}$, J2, K2, $b$, $\bar{b}$ on the flip-flops 38, 39. In the flip-flops 38′, 39′, the terminals $\bar{e}$, J4 are connected as are the terminals $f$, K3. The outputs $e$, $\bar{e}$, $f$, $\bar{f}$ are connected to the AND-gates 43′, 47′, 51′ over conductors 41′, 42′, 44′, 46′, 48′, 49′ in the same manner as are the corresponding elements in FIG. 2. J3, K4 are permanently connected to +4 volts. The output signals on conductor 40′ serve as clock pulses that trigger the flip-flops 38′, 39′ and thus result in sequentially opening the AND-gates 43′, 47′, 51′ so that signals (see FIG. 10) on the conductors 110′, 120′, 130′ can serve to open the switches SW4, SW5, SW6.

In addition to the terminals previously described a J–K flip-flop has a reset terminal. A pulse applied thereto overrides all other inputs and is independent of the state of the clock line. The reset terminals are not used in the counter 18 but is used in the counter 18′. For this purpose the conductor 140, over which the 2.0-mc. keying or reset pulse is sent, is connected through conductors 79, 81 to the respective reset terminals of the flip-flops 38′, 39′. The reset pulse causes the flip-flops 38′, 39′ to be reset to the conditions that should be present following actuation of red switch SW4, namely with J1, $e$, and $f$ all at state "1." The amplifier unit 64 may include suitable output circuitry to provide a pulse of the proper state ("1" or "0") for resetting the flip-flops. The use of the 2.0-mc. pulse thus insures that the operation of the switches SW4, SW5, SW6 does not get out of synchronism with the transmitted video since the 2.0-mc. pulse is transmitted after each cycle of operation of the switches SW1, SW2, SW3. In addition, of course, the pulse produces the in-synchronism phase shift of the switching sequence of SW4, SW5, SW6 in the receiver.

Figure 5:
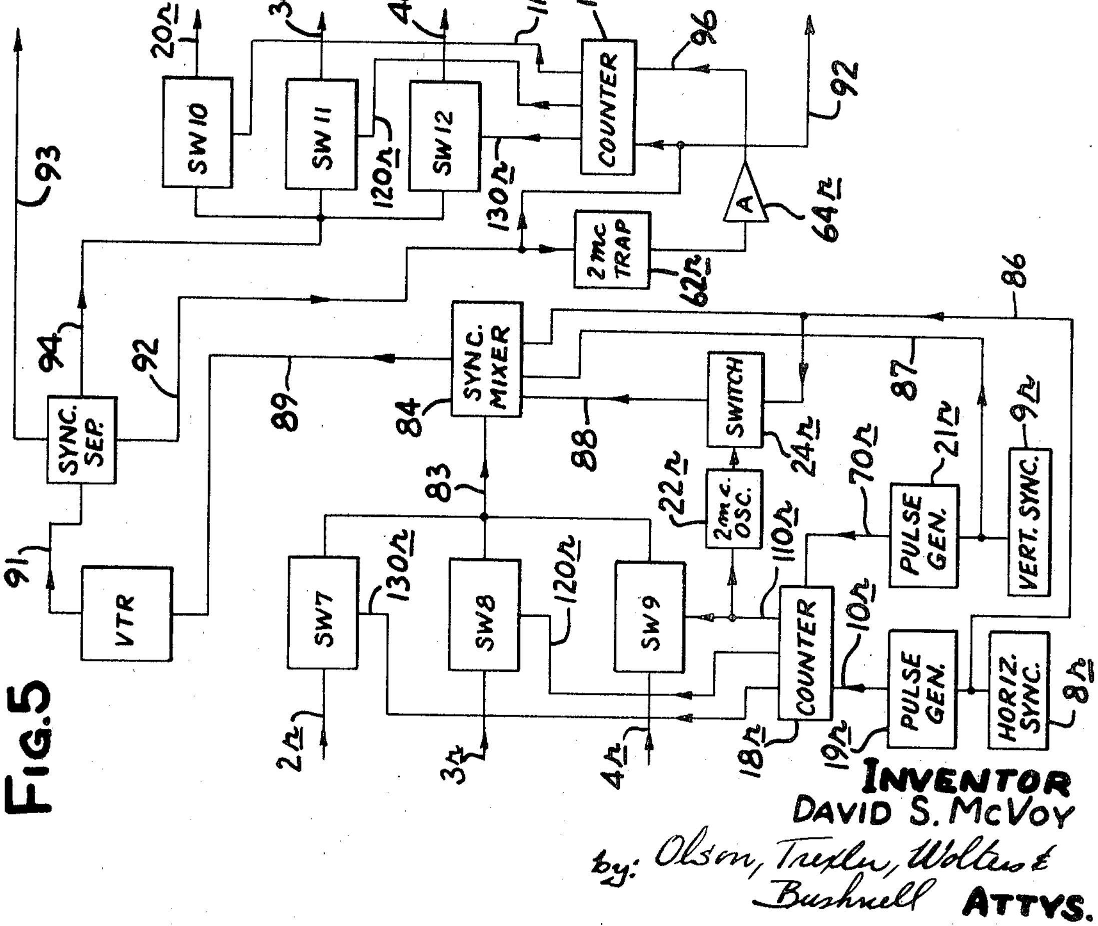
FIG. 5 is a block diagram of the videotape recorder and related circuitry which forms part of the present invention.

FIG. 5 shows an embodiment of the invention in the form of a videotape recorder. Like reference numerals with the addition of *r* indicate parts which are the same as those previously described and designated without the *r*.

In the recorder the red, green and blue video color-information signals from a receiver, camera or other program source are sent over conductors 2*r*, 3*r*, 4*r* to switches SW7, SW8, SW9. These switches correspond to the previously described switches SW1, SW2, SW3. Switches SW7, SW8, SW9 are controlled by signals on conductors 110*r*, 120*r*, 130*r* which transmit the output of the counter 18*r*. As in the transmitter, the counter 18*r* (being identical to counter 18) is activated once per line from the horizontal pulse generator 19*r* and once per frame from the vertical pulse generator 21*r*. The 2.0-mc. oscillator 22*r* is activated once per sequence of operation of the three switches, namely when switch SW9 is operated. The oscillator 22*r* is activated by the pulse over the conductor 86. Oscillator 22*r* is on during the entire horizontal synchronizing pulse rather than being delayed in order to provide for compatibility with standard color transmission. The successive video color signals from the switches SW7, SW8, SW9 pass over conductor 83 to a synchronizing signal mixer 84. Also sent to the mixer 84 over conductors 86, 87 are the vertical and horizontal synchronizing pulses plus the 2.0-mc. burst that is transmitted over conductor 88. The video signals, synchronizing pulses and oscillator bursts are mixed and sent over conductor 89 to the input of a standard black and white videotape recorder unit VTR containing the usual magnetic recoding and playback magnetic heads, etc. The signals are recorded in the usual manner for subsequent transmission.

When the recorder VTR is used for retransmission, the output signal is sent over conductor 91 to a conventional synchronizing signal separator circuit that sends the horizontal synchronizing pulses over conductor 92, the vertical synchronizing pulses over conductor 93, and the video signals over conductor 94. The video goes to switches SW10, SW11, SW12. These switches are functionally like the corresponding switches SW4, SW5, SW6 although physically the switches SW10, SW11, SW12 may actually be the components SW7, SW8, SW9 with a manually determined switching arrangement to use the components in either a recording or transmitting activity.

The horizontal pulses activate the counter 18*r*′ (identical to 18′) in a step-by-step manner to control the sequential operation of the switches SW10, SW11, SW12. The 2.0-mc. burst for each sequence of the switches passes the trap 62*r*, is amplified by amplifier 64*r* and is sent over conductor 96 to supply the reset pulse for the counter 18*r*′. Thus the signals on conductors 20*r*, 30*r*, 40*r* represent the video information of the respective monochromatic colors and are sequentially delivered in synchronism with their recording. These video signals and the horizontal and vertical synchronizing pulses on conductors 92, 93 may be mixed in a conventional synchronizing signal adder, and then the composite may be used to modulate a carrier in the usual way. Such signals can be received and decoded by the receiver of FIG. 3. However, to provide compatibility with standard telecasting techniques, the video signals are encoded conventionally before the encoded signal is mixed with the synchronizing signals.

For closed circuit operation of a transmitter (FIG. 1) or recorder (FIG. 5) with the receiver of FIG. 3, the mixed video output and synchronizing pulses may be directly connected via coaxial cable to the video amplifier 57 without the need for encoding the video.

Various other and conventional portions of the receiver, transmitter and tape recorder are not shown herein so as to simplify the description of the invention. For instance, the cathode circuits of the cathode-ray tube are not shown since the cathode of each electron gun is connected in the output of the video amplifier in the same manner as in a conventional black and white receiver. Thus each control grid-to-cathode circuit for an electron gun is similar to that in a black and white receiver. For this purpose the three cathodes may be commonly connected.

While the principles of the invention are herein shown and described, it is understood that various modifications can be made without departing from the scope of the invention.

I claim:

1. Color television equipment comprising circuit means for the passage of video signals representative of monochromatic light in scanned lines of a frame of video information, switches in said circuit means to control the passage of the signals therethrough, each switch being for signals representative of light of a predetermined color, means for operating the switches to open and close them in a predetermined sequence that repeats a number of times over a cycle comprising a frame of video information, and means for changing said sequence in a manner such that the opening and closing of each switch in a subsequent cycle is out of phase with the opening and closing of that switch in the first-mentioned cycle; said last-named two means comprising a counter, said counter including logic circuits that operate the counter in a repeating sequence, means providing vertical and horizontal synchronizing pulses for said video signals, said counter being operated in its sequence by pulses derived from the horizontal synchronizing pulses, there being a derived pulse to the counter for each line scanned and there being during each frame a pulse derived from the vertical synchronizing pulse, the pulse derived from the vertical synchronizing pulse effecting a shift of phase of the operation of said counter by cancelling the effect of one horizontal pulse.

2. Color television equipment according to claim 1 in which the means for operating the switches opens only one of the switches in synchronism with the scanning of each line, the switch that is opened for one scanned line in a frame being different from the switch that is opened for the next scanned line in said frame.

3. Color television equipment according to claim 2 further including means for transmitting a keying signal in a predetermined timed relation to the opening of only one of said switches.

4. Color television equipment according to claim 3 including means for imposing the keying signal on the blanking portion of a horizontal synchronizing pulse.

5. Color television equipment according to claim 2 including a videotape recorder, the outputs from said switches being transmitted to the recorder.

6. A color television system comprising means for producing sets of electrical signals from a line-by-line electron beam scanning of a photoemissive device, each set of signals representing the video output indicative of monochromatic light of known color for the scanned line, means for transmitting the sets of signals for the respective lines in a predetermined sequence that repeats a number of times over a cycle comprising a frame of video information, means operable at predetermined times for shifting the phase of the repeated sequence relative to a previous sequence, means for receiving said transmitted signals, means for transmitting a keying signal for each sequence, and means in said receiving means responsive to said keying signal for passing said signals over circuits therein in synchronism with the transmissions of said signals.

7. A system according to claim 6 further including means providing horizontal and vertical synchronizing pulses for said video signals, and means for imposing said keying signal on a horizontal synchronizing pulse.

8. A color television receiver comprising a cathode-ray tube having electron guns operable responsive to video signals representing predetermined colors and in which there are vertical and horizontal synchronizing pulses for the video signals, switches for controlling the passage of the video signals to the respective electron guns, first means for actuating the switches in a predetermined sequence that repeats a number of times over a cycle comprising a predetermined number of lines of video information, and second means responsive to a received keying signal for controlling the operation of said switch-actuating means to change said sequence once during each cycle; said first and second means including a counter operated in a repeating sequence responsive to said horizontal signals, said counter also being operated responsive to said keying signal, and means for inhibiting the operation of said counter from actuation in response to the vertical synchronizing pulse whereby to shift the phase of the counter.

9. A videotape recording system comprising circuit means for the passage of video signals representative of monochromatic light in scanned lines of a frame of video information, switches in said circuit means to control the passage of signals therethrough, each switch being for signals representative of light of a predetermined monochromatic color, means controlled by horizontal synchronizing pulses for the frame for effecting a sequential operation of the switches that passes a signal through one switch for each line scanned, said means being also controlled by vertical synchronizing pulses for each frame for changing said sequential operation, means for transmitting a keying signal upon the opening of predetermined one of said switches, means for mixing the synchronizing pulses with said keying signal and the outputs from said switches, and means for recording the composite signal resulting from said mixing.

10. Color television equipment comprising circuit means for the passage of video signals representative of monochromatic light in scanned lines of a frame of video information, switches in said circuit means to control the passage of the signals therethrough, each switch being for signals representative of light of a predetermined color, means for operating the switches to open and close them in a predetermined sequence that repeats a number of times over a cycle comprising a frame of video information, and means for changing said sequence in a manner such that the opening and closing of each switch in a subsequent cycle is out of phase with the opening and closing of that switch in the first-mentioned cycle, said last-named two means including means providing horizontal synchronizing pulses for the video signals; means for transmitting a keying signal in timed relation to the opening of only one of said switches and each time said one switch opens, and means for imposing said keying signal associated with said last-mentioned one switch.

* * * * *